United States Patent
Vankamamidi et al.

(10) Patent No.: US 11,093,317 B1
(45) Date of Patent: Aug. 17, 2021

(54) MANAGING UNCORRECTABLE USER DATA

(71) Applicant: EMC IP Holding Company LLC, Hopkinton, MA (US)

(72) Inventors: Vamsi K. Vankamamidi, Hopkinton, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/773,774

(22) Filed: Jan. 27, 2020

(51) Int. Cl.
*G06F 11/07* (2006.01)
*G06F 11/20* (2006.01)

(52) U.S. Cl.
CPC ........ *G06F 11/079* (2013.01); *G06F 11/0727* (2013.01); *G06F 11/0751* (2013.01); *G06F 11/0793* (2013.01); *G06F 11/2094* (2013.01); *G06F 2201/82* (2013.01)

(58) Field of Classification Search
CPC ............... G06F 11/1435; G06F 11/079; G06F 11/0727; G06F 11/0751; G06F 11/0793; G06F 11/2094; G06F 201/82; G06F 2201/82; G06F 11/2069; G06F 11/2056; G06F 11/073
See application file for complete search history.

(56) References Cited

U.S. PATENT DOCUMENTS

| | | | | |
|---|---|---|---|---|
| 8,601,209 B1* | 12/2013 | LeCrone | ............ | G06F 11/2097 711/112 |
| 8,612,382 B1* | 12/2013 | Patel | ................... | G06F 11/0793 707/609 |
| 9,146,921 B1 | 9/2015 | Vempati et al. | | |
| 9,916,191 B1* | 3/2018 | Pan | ...................... | G06F 11/0763 |
| 10,467,222 B1 | 11/2019 | Kuang et al. | | |
| 2002/0087673 A1* | 7/2002 | Selkirk | ............... | G06F 11/1076 709/223 |
| 2002/0169995 A1* | 11/2002 | Archibald, Jr. | ...... | G06F 11/1076 714/6.12 |
| 2005/0086562 A1* | 4/2005 | Demsky | .............. | G06F 11/0751 714/100 |
| 2007/0294570 A1* | 12/2007 | Polisetti | .............. | G06F 11/2094 714/6.13 |
| 2011/0296123 A1* | 12/2011 | Adler | .................. | G11C 14/0018 711/156 |
| 2014/0108855 A1* | 4/2014 | Gopakumar | .......... | G06F 11/008 714/6.2 |

OTHER PUBLICATIONS

Choudhary, Gyanesh Kumar, et al.; "Techniques for Efficiently Performing Filesystem Reorganization Tasks for Different Filesystems," U.S. Appl. No. 15/394,601, filed Dec. 29, 2016.

* cited by examiner

*Primary Examiner* — Yolanda L Wilson
(74) *Attorney, Agent, or Firm* — BainwoodHuang

(57) ABSTRACT

A technique for managing user data in a storage system includes accessing RAID metadata to identify user data that the storage system backs with broken RAID arrays. The technique further includes marking metadata that points to at least some of that user data to identify such user data as uncorrectable.

20 Claims, 5 Drawing Sheets

MANAGING UNCORRECTABLE USER DATA

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Many storage systems provide tools for checking internal consistency. For example, Linux-based systems may use FSCK (file system consistency check) to check and repair file system errors. Errors may arise, for example, from corruption in metadata used to map and organize file system data. Modern file systems include enough redundancy in metadata so that many errors can be repaired. Some errors may not be repairable, however, resulting in data loss.

SUMMARY

FSCK is typically able to identify uncorrectable data that results from damaged metadata. For example, FSCK can report a particular address range of a file or other object as being uncorrectable if block pointers that point to that address range are broken.

Metadata errors are not the only source of uncorrectable data, however. A disk drive that stores user data may itself fail, causing a data block to be lost even though the metadata pointing to that data block is undamaged. Some user data may be made uncorrectable because of damaged RAID storage.

Unfortunately, current consistency-checking tools do not identify bad data blocks. Checking metadata is relatively fast, but checking user data requires a great deal of time, as most file systems contain much more user data than metadata. An administrator may run FSCK to get a quick assessment of file-system health, but the administrator cannot generally spare the time needed to check all of the user data. Also, service level requirements can make it difficult to justify taking a storage system offline for long periods of time to perform detailed checking. Indeed, current versions of FSCK do not support such checking. The difficulty of checking integrity of user data means that an administrator may be unaware of bad data blocks for long periods of time. Errors may accumulate with unknown causes. It would therefore be desirable to perform at least some integrity checking of user data if it could be done efficiently.

In contrast with prior consistency-checking approaches, an improved technique for managing user data in a storage system includes accessing RAID metadata to identify user data that the storage system backs with broken RAID arrays. The technique further includes marking metadata that points to at least some of that user data to identify such user data as uncorrectable. Advantageously, the improved technique quickly identifies user data on broken RAID arrays without having to read the user data. In some examples, selective reading may proceed to narrow the amount of user data to be marked as uncorrectable. Such reading may be limited in scope, however, to user data residing on known-broken RAID arrays, thus presenting only a minimal additional burden to the storage system.

Certain embodiments are directed to a method of managing user data in a storage system. The method includes accessing RAID metadata that identifies a set of broken RAID arrays in which data loss has occurred and identifying, based on the RAID metadata, multiple pointer structures that point to user data in the set of broken RAID arrays. The pointer structures participate in mapping a set of data objects hosted by the storage system to underlying storage. The method further includes marking at least some of the identified pointer structures to identify user data that is uncorrectable.

Other embodiments are directed to a computerized apparatus constructed and arranged to perform a method of managing user data, such as the method described above. Still other embodiments are directed to a computer program product. The computer program product stores instructions which, when executed on control circuitry of a computerized apparatus, cause the computerized apparatus to perform a method of managing user data, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for managing user data in a storage system includes accessing RAID metadata to identify user data that the storage system backs with broken RAID arrays. The technique further includes marking metadata that points to at least some of that user data to identify such user data as uncorrectable.

Figure 1:
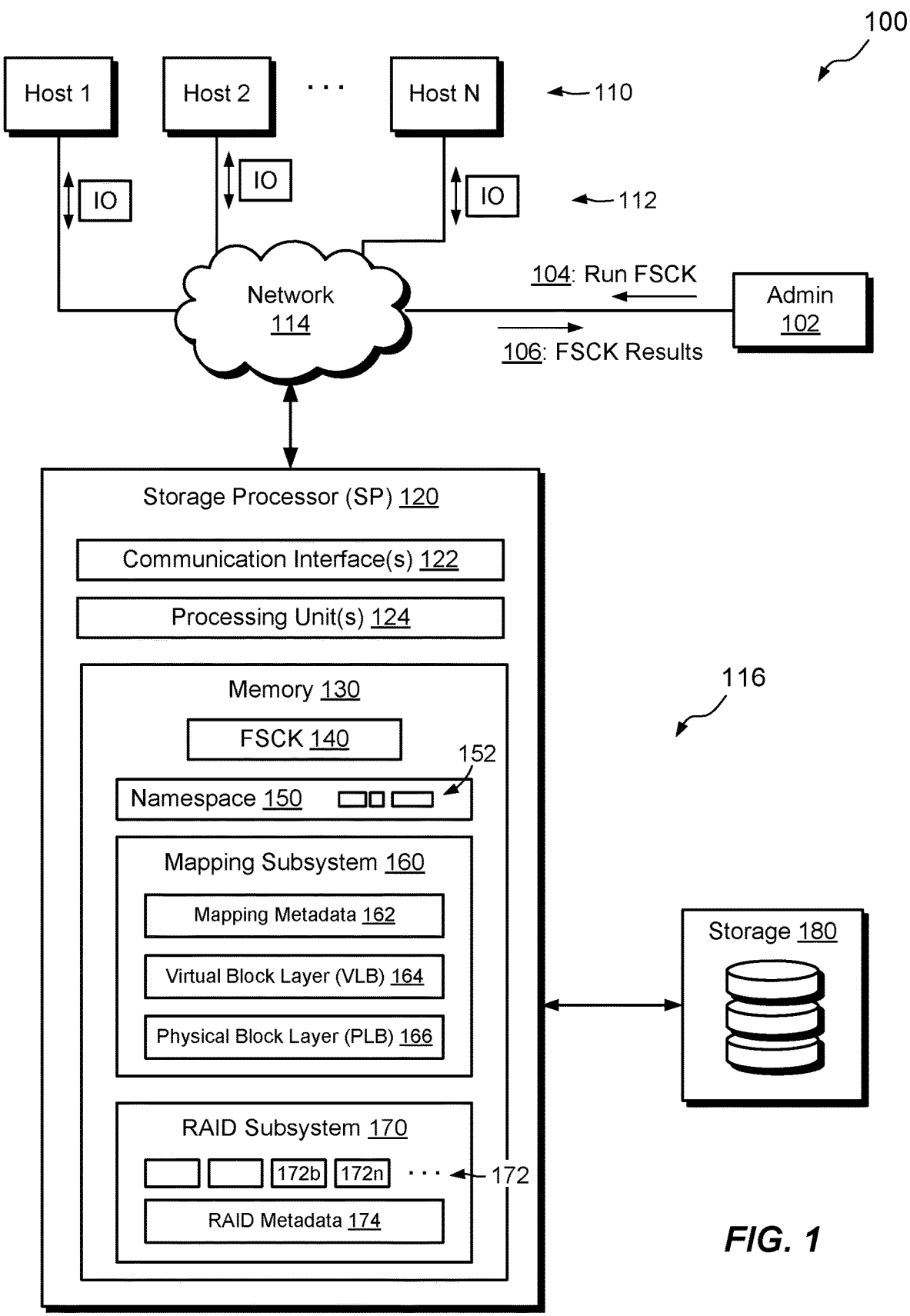
FIG. 1 is a block diagram of an example environment in which embodiments of the improved technique can be practiced.

FIG. 1 shows an example environment 100 in which embodiments of the improved technique can be practiced. Here, multiple hosts 110 and an administrative machine 102 access a data storage system 116 over a network 114. The data storage system 116 includes a storage processor, or "SP," 120 and storage 180, such as magnetic disk drives, electronic flash drives, and/or the like. The data storage system 116 may include multiple SPs. For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where separate hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units) and associated hardware. The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, an FSCK (file system check) facility 140, such as a program, tool, or utility. The memory 130 further includes a namespace 150, a mapping subsystem 160, and a RAID subsystem 170. The namespace 150 is configured to organize logical addresses of host-accessible data objects 152, e.g., LUNs (Logical UNits), file systems, virtual machine disks, and the like, which may be accessed by hosts 110. The mapping subsystem 160 is configured to perform mapping between logical addresses in the namespace 150 and corresponding addresses in the RAID subsystem 170. The RAID subsystem 170 is configured to organize storage 180 into RAID arrays 172, such as RAID groups and/or mapped RAID, and to associate RAID addresses with corresponding disk drive addresses in storage 180. The RAID subsystem 170 includes RAID metadata 174, which organizes disk drive resources into RAID arrays 172 and supports RAID protocols, e.g., for supporting reading, writing, parity computations, and rebuilding. Although the term "disk drive" is used herein, one should appreciate that the term is intended to cover any persistent storage type, including those which lack any physical "disk," such as flash drives and the like.

The mapping subsystem 160 is seen to include mapping metadata 162, a virtual block layer (VLB) 164, and a physical block layer (PLB) 166. The mapping metadata 162 include arrays of pointers which may be arranged in a tree, for mapping logical addresses in the namespace 150 to respective addresses in the VLB 164. The VLB 164 is configured to support block virtualization and deduplication. In an example, the VLB 164 includes individually addressable VLB elements. Each VLB element may have a pointer to a compressed data block in the PLB 166 and/or to another VLB element (e.g., for supporting block sharing). Data blocks may be 4 kB, 8 kB, or any other suitably-sized increment.

The physical block layer (PLB) 166 stores physical representations of compressed data blocks. In an example, the PLB 166 includes a large number of individual PLB storage extents of uniform size, such as 2 MB. Each PLB extent is separately addressable, and particular compressed data blocks may be addressed within PLB extents based on offset and length. The compressed blocks in the PLB 166 are backed by the RAID system 170, e.g., by RAID arrays 172 formed from disk drive resources in storage 180.

In example operation, hosts 110 issue I/O requests 112 to the data storage system 116. The I/O requests 112 include reads and/or writes directed to data objects 152 hosted by the data storage system 116, such as LUNs, file systems, virtual machine disks, and the like, which are backed by RAID arrays 172. Over time, some of the disk drives in the storage 180 may fail, causing RAID arrays 172 to become degraded. For example, a RAID array 172 with single parity becomes degraded when a single disk drive that provides storage for that RAID array 172 fails. If a second drive for that same RAID array 172 fails before the degraded state arising from the first disk failure can be corrected, then the result may be data loss. Unless there is a backup, the data loss will be unrecoverable.

The failures of disk drives in storage 180 are generally invisible to the namespace 150 and to the mapping subsystem 160. Such failures are generally known to the RAID subsystem 170, however, which may monitor the health status of disk drives on a regular basis.

In some examples, operations of the data storage system 116 proceed even after disk drives have failed. If host applications start to produce errors or otherwise behave erratically, an administrator may recognize the errors and issue an instruction 104 to run the FSCK facility 140. In some examples, the data storage system 116 may monitor its own errors and launch FSCK 140 automatically. The FSCK facility 140 may proceed, checking for metadata errors in the namespace 150 and mapping subsystem 160. For example, FSCK 140 may check for consistency among different metadata elements, identify inconsistencies, and repair errors. Any uncorrectable errors may be marked as such in metadata structures and reported back to the administrator, e.g., in FSCK results 106. For example, if a block pointer in the mapping subsystem 160 were broken, FSCK 140 might mark any user data pointed to by the broken block pointer as uncorrectable.

Prior versions of FSCK stop at the level of the VLB 164. For example, prior FSCK versions would not test whether the user data pointed to by the VLB 164 was healthy or damaged.

In accordance with improvements hereof, operation proceeds by accessing RAID metadata 174 to determine which RAID arrays 172 are broken. For example, RAID metadata 174 includes a list of RAID arrays 172 and their status, which may be "healthy," "degraded," or "broken," for example. Healthy RAID arrays have no disk failures. Degraded RAID arrays have one or more disk failures but no data loss, and broken RAID arrays have data loss (e.g., 2 or more disk failures in a single-parity arrangement, 3 or more disk failures with double-parity, etc.). For each RAID array 172 whose status is broken, FSCK 140 identifies the VLB elements that point to the data in the broken RAID array 172b ("b" indicating "broken"). As will be described more fully in connection with FIG. 2, the RAID metadata 174 associates each broken RAID array 172b with a first PLB storage extent stored in that RAID array 172b and with a descriptor of that PLB storage extent. The descriptor includes a back-pointer to the VLB element that points to the PLB storage extent. Once the VLB element has been identified via the back pointer, FSCK 140 may proceed in a variety of ways.

According to a first example, FSCK 140 proceeds by marking all VLB elements that point to the broken RAID array 172b as uncorrectable. FSCK 140 may then report back to the administrator the data objects 152 and address ranges within those data objects that correspond to the uncorrectable RAID elements. This approach is quick and effective, and it requires no reads of user data. It suffers from a major disadvantage, however, in that it labels certain data as uncorrectable when in fact it may be salvageable.

According to a second example, FSCK 140 proceeds more selectively and at higher granularity than in the first example. The second example recognizes that some disk drives that support the broken RAID array 172b may still be functional and may contain user data that can be salvaged. Accordingly, FSCK 140 iterates over all the VLB elements that point to user data in the broken RAID array 172b and issues a read request to access the user data pointed to by each VLB element. If the disk drive backing the accessed user data is broken, the read request fails. In this case, FSCK 140 marks the VLB element as uncorrectable. However, if the disk drive backing the user data is still working, the read request completes normally and returns the user data. There is no need to mark this VLB element as uncorrectable because the user data it points to is still reachable. Although this second example involves performing actual reads of user data, the scope of the reads is limited to user data in the broken RAID array 172b, which is expected to be very small compared with the amount of user data in the entire system. Thus, the performance penalty is not large. The advantages are great, however, as a significant amount of the user data in the broken RAID array 172b can be salvaged, sparing the administrator the task of recovering an even greater amount of lost data.

According to a third example, FSCK 140 proceeds as described in the second example, except that it obtains a new RAID array 172n (e.g., a free or a sparsely populated one; "n" indicating "new") and copies any salvaged data from the broken RAID array 172b to the new RAID array 172n, computing and storing parity for any copied data. For example, FSCK 140 iterates as before over all the VLB elements that point to user data in the broken RAID array 172b and issues a read request to access the user data pointed to by each VLB element. If the disk drive backing the accessed user data is broken, the read request fails and FSCK 140 marks the VLB element as uncorrectable, as before. But if the read request completes normally and returns the user data, FSCK 140 writes the user data to the new RAID array 172n, populating the new RAID array 172n with user data that has been salvaged from the broken RAID array 172b. FSCK 140 also computes and stores parity to account for the new writes. Although it involves additional writes as well as additional reads, this third example has an advantage over the second one in that the salvaged user data from the broken RAID array 172b is now stored in the new RAID array 172n, which is healthy and fully RAID protected. The salvaged user data is thus not at risk of further data loss if yet another disk-drive failure were to occur.

Although the disclosed activities are described in connection with an FSCK facility 140, one should appreciate that the activities are not limited to FSCK and may be performed in other contexts. Thus, the improvements disclosed herein are not limited to any particular program, utility, or the like.

Figure 2:
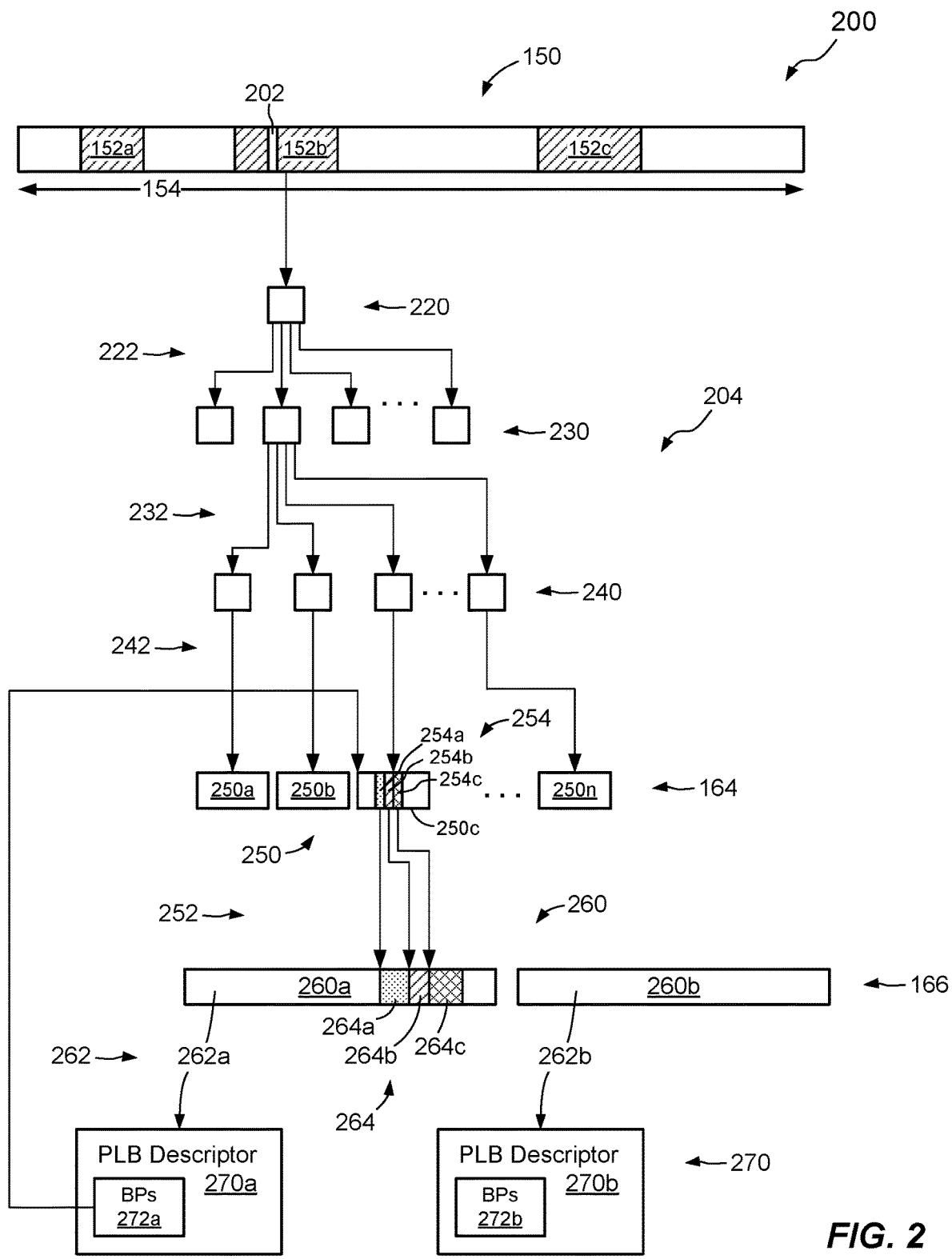
FIG. 2 is a block diagram of an example mapping arrangement in the environment of FIG. 1.

FIG. 2 shows an example mapping arrangement 200 which may be used in connection with the environment of FIG. 1. Here, namespace 150 of FIG. 1 includes a logical address space 154, which extends, for example, from zero to a very large number, such as 8 EB (exabytes). Disposed within respective ranges of the logical address space 154 are data objects 152, such as LUNs, file systems, virtual machine disks, and the like. Data objects 152a, 152b, and 152c are specifically shown, but there may be hundreds, thousands, or millions of available data objects 152. The mapping subsystem 160 maps each allocated logical address in the address space 154 to corresponding RAID storage in the RAID subsystem 170.

FIG. 2 further shows a partial mapping tree 204, which maps the logical address range of data object 152b. Here, mapping tree 204 includes a top node 220, mid nodes 230, and leaf nodes 240. For example, each mapping node 220, 230, or 240 includes an array of pointers, such as 512 pointers, which point to nodes in the level below. For example, top node 220 includes up to 512 pointers 222 to respective mid nodes 230, and each mid node 230 includes up to 512 pointers 232 respective leaf nodes 240. Each leaf node 240 includes up to 512 pointers 242 to respective VLB elements 254 in VLB 164. The data storage system 116 may store top nodes 220, mid nodes 230, and leaf nodes 240 in metadata blocks, which may be stored separately from user data blocks, e.g., in a dedicated metadata tier (not shown).

VLB elements 254 are arranged in VLB blocks, such as VLB blocks 250a through 250n. VLB blocks may be stored in the metadata tier or in a separate tier, such as a dedicated VLB tier (not shown). In an example, each VLB block 250 stores multiple VLB elements 254. VLB elements 254 may be pointed to individually by pointers in leaf nodes 240 and/or by pointers in other VLB elements 254. In an example, each VLB element 254 is configured to include the following metadata:

- A pointer 252 to user data in the PLB 166, such as a PLB storage extent, an offset, and a length; may alternatively point to another VLB element 254, e.g., for supporting deduplication.
- A compression flag indicating whether the pointed-to user data is compressed. In some cases the flag may specify a compression algorithm.
- A reference count, such as a number of pointers that point to that VLB element 254, e.g., from leaf nodes 240 and/or other VLB elements 254.
- A CRC (cyclic redundancy check) or other checksum of the pointed-to user data.

The identified metadata is merely illustrative and should not be regarded as required or exclusive. Different implementations may use different metadata.

Below the tree 204 can be seen portions of the PLB 166, which includes representations of user data, typically in compressed form. Here, PLB 166 includes multiple PLB storage extents 260, such as PLB storage extents 260a and 260b. Any number of such PLB storage extents 260 may be provided. In an example, each PLB storage extent 260 represents a contiguous range of RAID storage, such as a single 2-MB RAID stripe.

Each illustrated VLB element 254 points to respective PLB data 264. For example, VLB element 254a points to PLB data 264a, VLB element 254b points to PLB data 264b, and VLB element 254c points to PLB data 264c. The PLB data 264 have different lengths, reflecting the fact that different user data is compressible to different degrees. Although the figure shows only a few examples, one should appreciate that the PLB storage extents 260 are preferably packed fully with compressed data to maximize storage efficiency. In addition, there is no need for data 264 to be entirely contained within one PLB storage extent 260. For example, some data may extend across extents 260.

As shown at the bottom of FIG. 2, each PLB storage extent 260 may be associated 262 (e.g., 262a or 262b) with a respective PLB descriptor 270 (e.g., 270a or 270b). Each PLB descriptor 270 provides descriptive information about the respective PLB storage extent 260. The descriptive information may include one or more back-pointers 272 (e.g., 272a or 272b), which point back to the VLB elements 254 that point to the data in the respective PLB storage extent 260. In an example, each PLB storage extent 260 is associated with a single, respective PLB descriptor 270 and that PLB descriptor 270 may include up to eight back pointers 272. Given that VLB elements 254 and PLB data 264 are generally laid out in a corresponding order, eight back pointers 272 is generally sufficient to point to all the VLB elements that point to the PLB data of a respective PLB storage extent 260. Note that VLB elements 254 may be inferred for consecutively-stored data such that a separate back pointer 272 is not needed for every VLB element 254 that points to a PLB storage extent 260.

In an example, PLB descriptors 270 reside in the metadata tier. PLB descriptors 270 may be grouped together based on RAID array 172 (FIG. 1), such that each RAID array 172 is associated with a corresponding set of PLB descriptors 270. One should appreciate that the detailed mapping structure 200 shown in FIG. 2 is merely one example or a workable arrangement and is not intended to be limiting.

Figure 3:
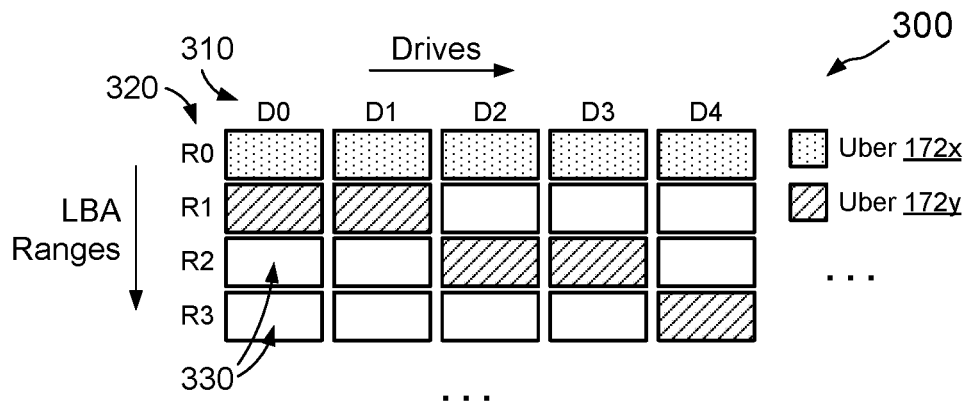
FIG. 3 is a diagram showing an example, simplified mapped RAID arrangement.

FIG. 3 shows an example mapped RAID arrangement 300 which may be used in the environment 100 of FIG. 1. Here, multiple disk drives 310 (e.g., D0-D4) are shown in respective columns, and multiple LBA (logical block address) ranges 320 of those disk drives 310 (e.g., R0-R4) are shown in respective rows. Each LBA range corresponds to a sizable amount of storage space, such as 1 GB, for example. Each row-column intersection identifies a respective RAID strip 330, which corresponds to a range of a respective disk drive 310.

RAID strips 330 may be combined as building blocks to form the aforementioned RAID arrays 172. RAID arrays 172 may also be referred to herein as "uber-stripes" or simply "ubers." Two ubers 172x and 172y are specifically shown. Both ubers 172x and 172y have a RAID 4+1 arrangement, where there are four data strips and one parity strip. Other arrangements are also feasible, such as RAID 8+1 (eight data strips and one parity strip), RAID 4+2, RAID 8+2, and the like. As shown by the example of uber 172y, ubers may be formed from strips 330 that have different LBA ranges 320. To conform with RAID requirements, however, no two strips 330 in a given uber 172 may reside on the same disk drive 310, as such an arrangement would undermine the redundancy of RAID protection. Although only five disk drives 310 and four ranges 320 are shown, one should appreciate that commercial data storage systems may include hundreds of disk drives 310 covering much larger ranges. The example shown is intended to be simplified for illustration.

It is clear from FIG. 3 that the failure of a single disk drive 310 can affect multiple ubers 172. For example, a failure of D0 would cause ubers 172x and 172y to assume a degraded state. Given that the depicted RAID 4+1 arrangement provides single parity, all the user data on each of ubers 172x and 172y would still be present and accessible, however. But if a second disk drive were to fail before D0 could be repaired, then ubers 172x and 172y would be rendered broken, instead of merely degraded, as such ubers would each have two failing strips 330 and only one parity. RAID protocols would be unable to recover the lost data.

When used herein in connection with a disk drive or RAID array, the term "broken" simply means that data on that disk drive or RAID array is not accessible in the usual manner. Broken thus means not working normally. Data may sometimes be recoverable from a broken drive after the drive is taken offline, but such recovery mechanisms are outside the scope of this disclosure.

Figure 4:
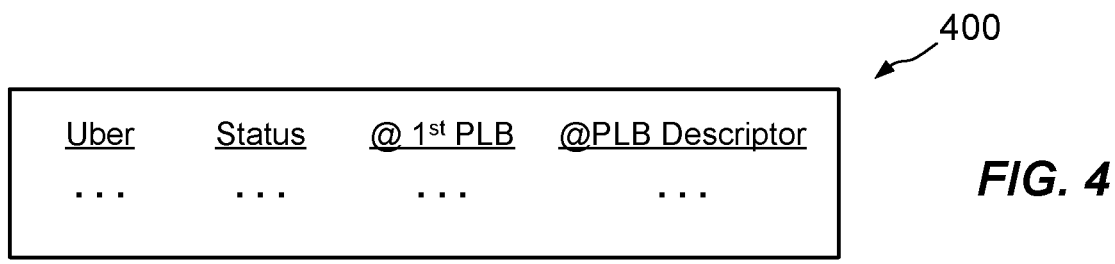
FIG. 4 is a diagram showing an example table of RAID arrays.

FIG. 4 shows an example uber table 400 which may be used in the environment 100 of FIG. 1. For example, uber table 400 may be part of RAID metadata 174 of the RAID subsystem 170.

As shown, the uber table 400 associates each uber 172 with a respective status, such as "healthy," "degraded," or "broken," for example, thereby tracking information pertaining to failed disk drives 310 and their effects on ubers 172. The uber table 400 may also associate each uber 172 with a respective address of a first PLB storage extent 260 (FIG. 2) stored in that uber 172. Each uber 172 may include a large number of PLB storage extents 260 and may arrange them in consecutive order.

Figure 5:
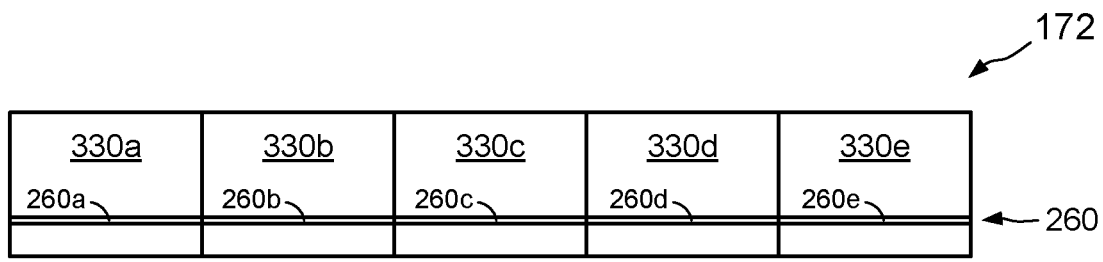
FIG. 5 is a diagram showing a single RAID array.

Referring briefly to the example of FIG. 5, a PLB storage extent 260 is realized as a RAID stripe across an uber 172. The uber 172 is composed of strips 330a-330e, which are seen to include respective RAID elements 260a-260e. If a PLB storage extent 260 is 2 MB in size, then RAID elements 260a-260e are each 512 kB (the RAID element used for parity does not contribute to the size of the PLB storage extent 260).

Returning to FIG. 4, the uber table 400 further associates each uber 172 with a respective location of a PLB descriptor 170, i.e., the PLB descriptor 170 of the first PLB storage extent 260 in the respective uber 172. Given that PLB descriptors 170 for consecutive PLB storage extents 260 that belong to the same uber are themselves consecutively ordered, having the location of the first PLB descriptor 170 effectively provides the location of all the PLB descriptors 170 for the respective uber 172.

One should appreciate that the uber table 400 significantly assists in identifying uncorrectable user data arising from failed disk drives, as it provides clear associations between broken ubers (ubers 172 having status="broken"), PLB storage extents 260 that belong to those broken ubers 172, and locations of the associated PLB descriptors 170. Using this information, the FSCK facility 140 can follow the back pointers 272 found in the indicated PLB descriptors 270 (FIG. 2) to identify the VLB elements 254 that point to the user data in the broken ubers. The FSCK facility 140 can then mark the identified VLB elements 254 as uncorrectable, enabling the FSCK facility 140 to identify the corresponding data objects and logical addresses that contain the uncorrectable data and report the same to the administrator.

Figure 6:
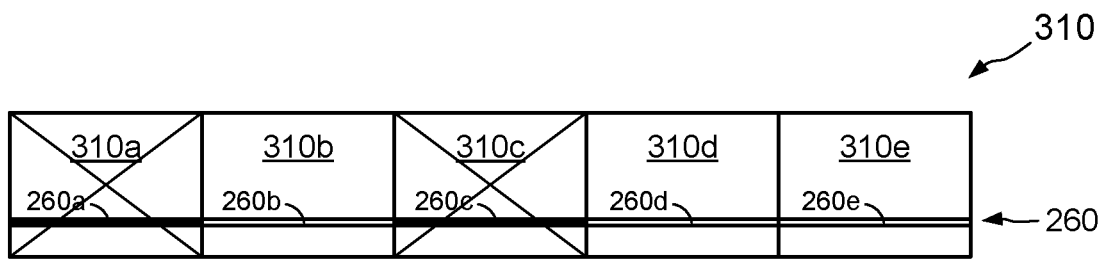
FIG. 6 is a diagram showing the RAID array of FIG. 3 following a double-drive failure.

FIG. 6 shows the same uber 260 of FIG. 5 but after two disk drive failures. Uber 260 is thus in a broken state. Strips 310a and 310c have become inaccessible, making RAID storage elements 260a and 260c unreadable. It is observed that any user data stored on strips 310b, 310d, or 310e may still be recoverable, however.

Figure 7:
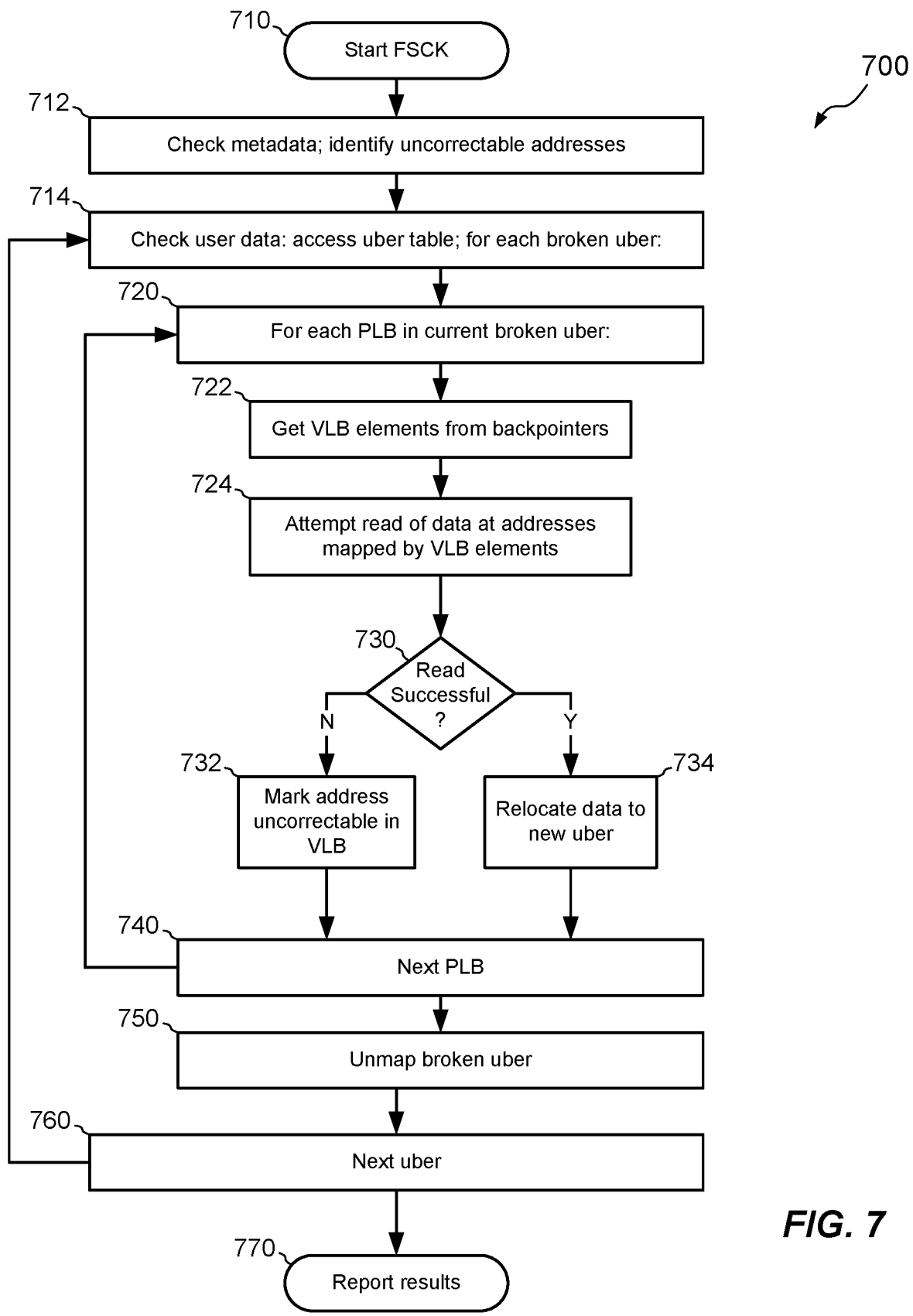
FIGS. 7 and 8 are flowcharts showing example methods of managing user data in a storage system.
Figure 8:
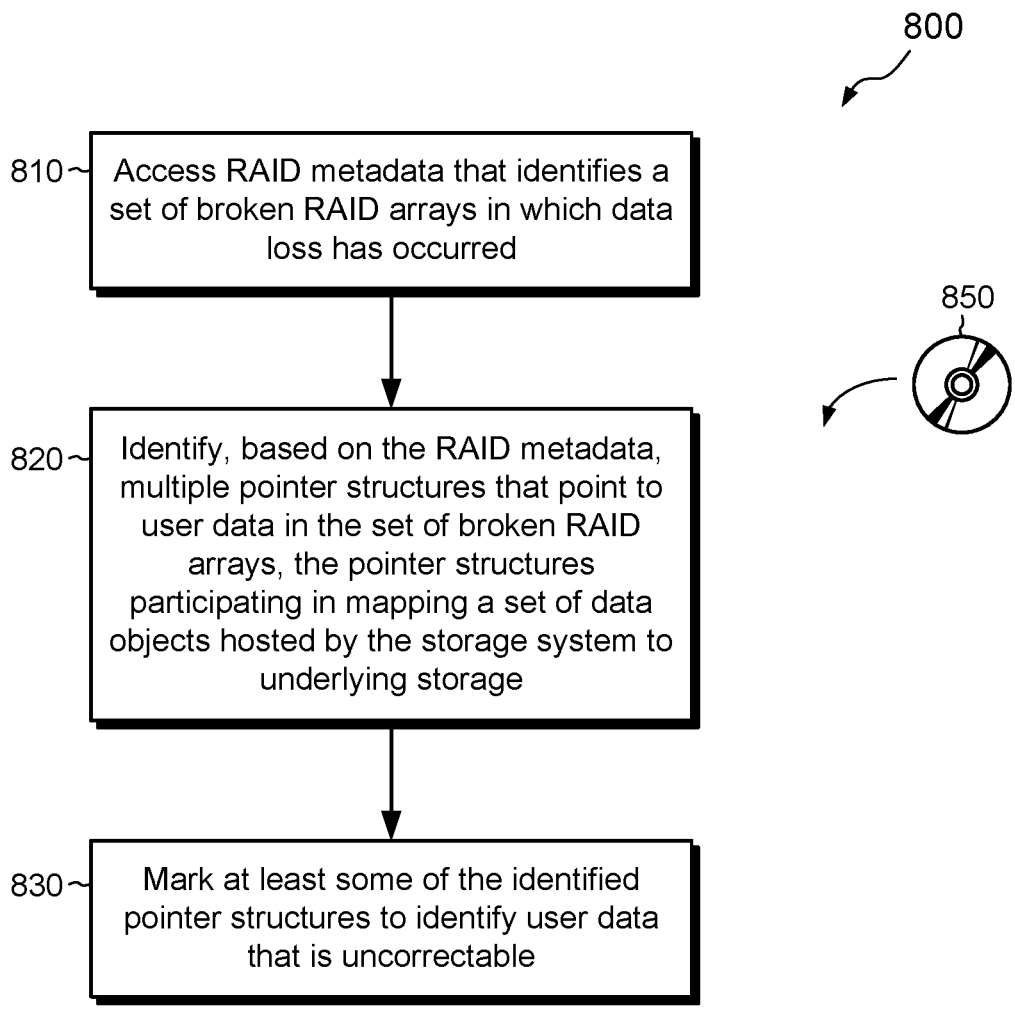

FIGS. 7 and 8 shows example methods 700 and 800 that may be carried out in connection with the environment 100. The methods 700 and 800 are typically performed, for example, by the software constructs described in connection with FIG. 1, which reside in the memory 130 of the storage processor 120 and are run by the set of processing units 124. The various acts of methods 700 and 800 may be ordered in any suitable way. Accordingly, embodiments may be constructed in which acts are performed in orders different from those illustrated, which may include performing some acts simultaneously.

Starting with FIG. 7, method 700 begins at 710, by staring the FSCK facility 140. For example, an administrator launches FSCK in response to observing anomalous behavior of host applications, such as read and/or write failures and/or errors. Alternatively, the data storage system 116 may run FSCK automatically, e.g., in response to detecting errors or on some regularly-scheduled basis.

At 712, FSCK 140 runs in the usual manner, checking metadata for consistency and attempting to correct errors. In cases where errors cannot be corrected, FSCK 140 may mark certain logical addresses or address ranges as uncorrectable.

At 714, FSCK 140 proceeds to check user data. Although the illustrated example shows user data being checked only after checking metadata, this ordering is merely an example, as either may be checked first. Also, metadata checking may be regarded as optional for purposes of this disclosure. To begin checking user data, FSCK 140 may access the uber table 400 and to iterate over all broken ubers 172b listed in the table 400, e.g., each listed uber 172 having status="broken."

At 720, FSCK 140 selects a current, broken uber 172b for processing. FSCK 140 then iterates over all PLB storage extents 260 in the current uber.

At 722, FSCK 140 may start with the first PLB storage extent 260 (e.g., the one listed for the current uber in the uber table 400). For this current PLB storage extent 260, FSCK 140 identifies the VLB elements 264 that point to the current PLB storage extent 260, e.g., by following the back pointers 272.

At 724, FSCK 140 issues read requests to the user data pointed by the VLB elements 264 located via the back pointers 272, e.g. by following the pointers 252 to the PLB 166 stored in the VLB elements 264.

At 730, FSCK 140 checks whether each read is successful. At 732 if a current read of user data is not successful, e.g., if the read request fails, FSCK 140 marks the corresponding address as uncorrectable. For example, FSCK sets a flag or other data element in the corresponding VLB element 264 to indicate that the pointed-to user data is lost. At 734 if the current read succeeds and returns the requested user data, FSCK 140 writes the obtained user data to a new uber 172n, e.g., to a newly-allocated or sparsely populated uber 172n.

Acts 730, 732, and 734 may be repeated for each VLB element 264 that maps user data of the current PLB storage extent 260. When all such VLB elements 264 have been processed for the current PLB storage extent 260, processing for the current PLB storage extent 260 is complete. All the uncorrectable user data has been marked as such and all user data from the current PLB storage extent 260 that can be salvaged in this manner has been salvaged and persisted in the new uber 172n. Operation can then proceed to the other PLB storage extents 260 in the current uber.

At 740, FSCK 140 obtains the next PLB storage extent 260 for the current uber 172b. FSCK then repeats the acts 722, 724, 730, and 732 or 734 for the next (now current) PLB storage extent 260, salvaging what user data it can and preserving it in the new uber 172n. Once all PLB storage extents 260 for the current uber have been processed in this matter, all uncorrectable user data in the current uber has been marked as such and all user data that can be salvaged using this approach has been salvaged.

At 750, the current, broken uber may be unmapped, meaning that it may be decomposed into its constituent strips 330. Strips 330 that are not derived from any failed disk drive are returned to circulation, e.g., by placing them in a pool of free strips from which new ubers 172 may be formed. Strips 330 from any failed disk drives are removed from circulation. The associated disk drives may be removed from the system.

At 760, operation proceeds to the next broken uber, e.g., the next uber having status="broken" in the uber table 400. Each such uber may be processed as described above for the first broken uber. Once all broken ubers have been processed according to method 700, with associated user data either marked as uncorrectable or salvaged, operation may proceed to 770, whereupon FSCK reports its results. For example, FSCK may output a result screen that identifies data objects 152 and corresponding logical addresses where user data has been found to be uncorrectable. The administrator can then take action accordingly, e.g., by ordering restores or any lost data, by pausing applications until data can be recovered, or the like. The administrator is thus in an informed position to take appropriate action, which is more than he or she would have been without the user-data checking provided with the disclosed technique.

Proceeding now to FIG. 8, a general overview is presented of certain features described above. Method 800 begins at 810, by accessing RAID metadata 174, such as the uber table 400. The accessed RAID metadata identifies a set of broken RAID arrays 172b in which data loss has occurred.

At 820, method 800 identifies, based on the RAID metadata 174, multiple pointer structures (e.g., 254) that point to user data in the set of broken RAID arrays 172b. The pointer structures 254 participate in mapping a set of data objects 152 hosted by the storage system 116 to underlying storage 180.

At 830, method 800 marks at least some of the identified pointer structures 254 to identify user data that is uncorrectable. For example, method 800 may mark as uncorrectable pointer structures that map all user data on the set of broken RAID arrays 172b. Alternatively, method 800 marks as uncorrectable only the pointer structures 254 that map user data that cannot be read. For the user data that is still readable, the method 800 may copy the readable user data to a new RAID array 172n.

An improved technique has been described for managing user data in a storage system 116. The technique includes accessing RAID metadata 174 to identify user data that the storage system 116 backs with broken RAID arrays 172b. The technique further includes marking metadata (e.g., 162, 164, and/or 166) that points to at least some of the user data to identify such user data as uncorrectable. Advantageously, the improved technique quickly identifies user data on broken RAID arrays 172b without having to read that user data. In some examples, selective reading may proceed to narrow the amount of user data to be marked as uncorrectable.

Having described certain embodiments, numerous alternative embodiments or variations can be made. For example, although embodiments have been described in connection with an FSCK facility 140, this is merely an example, as other embodiments may be realized in other forms. For example, the disclosed technique of identifying uncorrectable user data may be run independently of FSCK.

Further, although FSCK may be regarded as a file system utility, it is not limited to file systems, per se. For example, the instance of FSCK described above may be used in any storage system that performs storage mapping, whether anything that can be identified as a file system is present or not.

Further, the pointer structures have been shown and described herein as VLB elements 254. This is not required, however. Alternatively, the pointer structures may be provided in other forms. For example, leaf nodes 240 may also be considered as pointer structures.

Also, although the RAID arrays 172 have been shown and described as mapped RAID arrays (e.g., "ubers"), one should appreciate that RAID arrays 172 may be formed in other ways, such as by using RAID groups or other arrangements of RAID elements.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 850 in FIG. 8). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing user data in a storage system, the method comprising:

accessing RAID metadata that identifies a set of broken RAID arrays in which data loss has occurred;

identifying, based on the RAID metadata, multiple pointer structures that point to user data in the set of broken RAID arrays, the pointer structures participating in mapping a set of data objects hosted by the storage system to underlying storage; and marking at least some of the multiple pointer structures to identify user data that is uncorrectable.

2. The method of claim 1, wherein the acts of accessing, identifying, and marking are performed by a consistency-checking facility that runs in the storage system, the consistency-checking facility also checking for uncorrectable user data that arises from damaged metadata.

3. The method of claim 2, wherein identifying the pointer structures that point to the user data in the set of broken RAID arrays includes:

identifying the broken RAID arrays from the RAID metadata;

identifying multiple storage extents within the broken RAID arrays;

accessing descriptors of the multiple storage extents; and following back-pointers associated with the descriptors to locate the pointer structures.

4. The method of claim 2, further comprising generating results of the consistency-checking facility, the results identifying one or more data objects mapped to the set of broken RAID arrays and associated addresses at which user data is uncorrectable.

5. The method of claim 1, wherein the pointer structures are part of a virtual block layer used for mapping the set of data objects.

6. The method of claim 1, wherein marking at least some of the multiple pointer structures includes marking as uncorrectable pointer structures that point to unreadable user data but not marking as uncorrectable pointer structures that point to readable user data.

7. The method of claim 6, further comprising distinguishing the readable user data from the unreadable user data based on issuing read requests to the user data pointed to by the multiple pointer structures and determining whether the read requests succeed or fail.

8. The method of claim 7, further comprising copying the readable user data to a functioning RAID array in the storage system.

9. The method of claim 8, wherein the broken RAID array is composed of storage strips derived from respective storage drives, the storage drives including a set of working drives and a set of broken drives, and wherein the method further comprises, after copying the readable user data to the functioning RAID array, unmapping the broken RAID array and making the storage strips of the set of working drives available for use in forming new RAID arrays.

10. A computerized apparatus, comprising control circuitry that includes a set of processing units coupled to memory, the control circuitry constructed and arranged to:
   access RAID metadata that identifies a set of broken RAID arrays in which data loss has occurred;
   identify, based on the RAID metadata, multiple pointer structures that point to user data in the set of broken RAID arrays, the pointer structures forming part of system metadata used for mapping a set of data objects hosted by the computerized apparatus to underlying storage; and
   for at least some of the multiple pointer structures, marking the system metadata to identify user data that is uncorrectable.

11. The computerized apparatus of claim 10, wherein the control circuitry configured to mark at least some of the multiple pointer structures is further configured to mark as uncorrectable pointer structures that point to unreadable user data but not to mark as uncorrectable pointer structures that point to readable user data.

12. The computerized apparatus of claim 11, wherein the control circuitry is further configured to copy the readable user data to a functioning RAID array.

13. A computer program product including a set of non-transitory, computer-readable media having instructions which, when executed by control circuitry of a computerized apparatus, cause the computerized apparatus to perform a method of managing user data, the method comprising:
   accessing RAID metadata that identifies a set of broken RAID arrays in which data loss has occurred;
   identifying, based on the RAID metadata, multiple pointer structures that point to user data in the set of broken RAID arrays, the pointer structures participating in mapping a set of data objects hosted by the storage system to underlying storage; and
   marking at least some of the multiple pointer structures to identify user data that is uncorrectable.

14. The computer program product of claim 13, wherein the acts of accessing, identifying, and marking are performed by a consistency-checking facility that runs in the storage system, the consistency-checking facility also checking for uncorrectable user data that arises from damaged metadata.

15. The computer program product of claim 14, wherein the method further comprises generating results of the consistency-checking facility, the results identifying one or more data objects mapped to the set of broken RAID arrays and associated addresses at which user data is uncorrectable.

16. The computer program product of claim 13, wherein marking at least some of the multiple pointer structures includes marking as uncorrectable pointer structures that point to unreadable user data but not marking as uncorrectable pointer structures that point to readable user data.

17. The computer program product of claim 16, further comprising distinguishing the readable user data from the unreadable user data based on issuing read requests to the user data pointed to by the multiple pointer structures and determining whether the read requests succeed or fail.

18. The computer program product of claim 17, wherein the method further comprises copying the readable user data to a functioning RAID array in the storage system.

19. The method of claim 18, wherein the broken RAID array is composed of storage strips derived from respective storage drives, the storage drives including a set of working drives and a set of broken drives, and wherein the method further comprises, after copying the readable user data to the functioning RAID array, unmapping the broken RAID array and making the storage strips of the set of working drives available for use in forming new RAID arrays.

20. The computer program product of claim 13, wherein identifying the pointer structures that point to the user data in the set of broken RAID arrays includes:
   identifying the broken RAID arrays from the RAID metadata;
   identifying multiple storage extents within the broken RAID arrays;
   accessing descriptors of the multiple storage extents; and
   following back-pointers associated with the descriptors to locate the pointer structures.

* * * * *